(12) United States Patent
Gleason et al.

(10) Patent No.: US 7,999,496 B2
(45) Date of Patent: Aug. 16, 2011

(54) METHOD AND APPARATUS TO DETERMINE ROTATIONAL POSITION OF AN ELECTRICAL MACHINE

(75) Inventors: Sean E Gleason, West Bloomfield, MI (US); Steven E. Schulz, Torrance, CA (US); Patrick M. Prihoda, Fishers, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 297 days.

(21) Appl. No.: 11/743,901

(22) Filed: May 3, 2007

(65) Prior Publication Data

US 2008/0272717 A1    Nov. 6, 2008

(51) Int. Cl.
*H02P 6/06*    (2006.01)
(52) U.S. Cl. .................... 318/139; 318/400.37; 318/661
(58) Field of Classification Search .................. 318/139, 318/400.32, 400.33, 400.37, 400.38, 661
See application file for complete search history.

(56) References Cited

U.S. PATENT DOCUMENTS

| | | | |
|---|---|---|---|
| 4,691,152 A * | 9/1987 | Ell et al. ..................... | 318/616 |
| 6,014,598 A * | 1/2000 | Duyar et al. .................... | 701/29 |
| 6,547,699 B2 * | 4/2003 | Eich et al. ..................... | 477/175 |
| 6,731,085 B2 * | 5/2004 | Sardar et al. .................. | 318/434 |
| 6,832,148 B1 | 12/2004 | Bennett | |
| 6,868,318 B1 | 3/2005 | Cawthorne | |
| 6,953,409 B2 | 10/2005 | Schmidt et al. | |
| 6,984,954 B2 * | 1/2006 | Leonardi et al. ............. | 318/602 |
| 7,002,318 B1 * | 2/2006 | Schulz et al. ................. | 318/782 |
| 7,116,077 B2 * | 10/2006 | Raftari et al. ................. | 318/798 |
| 7,154,236 B1 | 12/2006 | Heap | |
| 7,184,927 B2 * | 2/2007 | Anghel et al. ........... | 318/400.04 |
| 7,216,061 B2 * | 5/2007 | Yuan et al. .................... | 702/185 |
| 2005/0076958 A1 | 4/2005 | Foster | |
| 2005/0077867 A1 | 4/2005 | Cawthorne | |
| 2005/0077877 A1 | 4/2005 | Cawthorne | |
| 2005/0080523 A1 | 4/2005 | Bennett | |
| 2005/0080527 A1 | 4/2005 | Tao | |
| 2005/0080535 A1 | 4/2005 | Steinmetz | |
| 2005/0080537 A1 | 4/2005 | Cawthorne | |
| 2005/0080538 A1 | 4/2005 | Hubbard | |
| 2005/0080539 A1 | 4/2005 | Hubbard | |
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |

(Continued)

FOREIGN PATENT DOCUMENTS

CN    1767353 A    5/2006

(Continued)

*Primary Examiner* — Bentsu Ro (57) ABSTRACT

A control system and method to determine position of a rotor relative to a stator for a synchronous multipole electrical machine is presented, including one for application on a fuel/electric hybrid powertrain for a vehicle. The machine includes a stator, a rotor, and a rotor position sensing mechanism. The control system controls the electrical machine, in conjunction with an electrical storage device and an inverter, using algorithms and calibrations which derive a rotor position based upon a sensorless position sensing technique, and determine an offset from a sensed rotor position. Electrical output from the inverter to the machine is controlled based the offset, which is stored non-volatile memory. A rotor position is derived based upon a sensorless position sensing technique during initial machine operation after startup of the machine, and includes operation in a torque-generative mode and in an electrical energy-generative mode.

15 Claims, 6 Drawing Sheets

U.S. PATENT DOCUMENTS

| | | |
|---|---|---|
| 2005/0189918 A1 | 9/2005 | Weisgerber |
| 2005/0216225 A1* | 9/2005 | Anghel et al. ............... 702/151 |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0112412 A1 | 4/2009 | Cawthorne |
| 2009/0118917 A1 | 5/2009 | Sah |
| 2009/0144002 A1 | 6/2009 | Zettel |

FOREIGN PATENT DOCUMENTS

| | | |
|---|---|---|
| DE | 10314696 A1 | 10/2004 |
| DE | 102004055042 A1 | 7/2005 |

* cited by examiner

METHOD AND APPARATUS TO DETERMINE ROTATIONAL POSITION OF AN ELECTRICAL MACHINE

TECHNICAL FIELD

This invention pertains generally to control of an electrical machine, and more specifically to a control system for an electric machine to determine rotational position to optimize energy usage to supply motive torque in a vehicle propulsion system.

BACKGROUND OF THE INVENTION

Control systems for electrical motors typically include a feedback device such as a position sensor to provide data to measure position and rotational velocity of the motor. On a three-phase multipole synchronous electrical motor, precise and accurate measurement of position of a rotor relative to each of the poles of a stator is important to achieve efficient transmission of electrical energy. Rotor position is typically measured using the position sensor to determine position of the resolver. Position of the resolver relative to the machine rotor is subject to error due to factors including manufacturing variations and tolerances. Electrical motor manufacturers have attempted to correct errors in resolver position measurement using adjustments and post-assembly calibrations. Manufacturers have also attempted to correct sensor-related errors by introducing sensorless techniques for determining rotor position by monitoring and analyzing electromagnetic characteristics of the motor.

Vehicle propulsion systems comprising hybrid powertrains are known for managing the input and output torques of various torque-generative devices, most commonly internal combustion engines and electric machines. One hybrid powertrain architecture comprises a two-mode, compound-split, electro-mechanical transmission which utilizes an input member for receiving torque from a torque-generative source, e.g. an internal combustion engine, and an output member for delivering motive torque from the transmission to a vehicle driveline. Motive torque is transmitted to the transmission from first and second electrical machines operatively connected to an energy storage device for interchanging electrical power therebetween. A controller is provided for regulating the electrical power interchange between the energy storage device and the electrical machines.

The electrical machines preferably comprise known permanent magnet synchronous motor/generator machines, each constructed of a multi-pole electrical stator and a rotor device. Such machines are preferable for powertrain and vehicle applications because they exhibit high torque-to-inertia ratios, high efficiency, and high power density. In such machines, the controller requires accurate and precise information regarding position of the rotor device relative to the stator in order to optimize electrical energy efficiency, thus leading to improved fuel economy.

Prior art systems utilize such techniques as tight machine tolerances and assembly methods, coupled with multiple position sensing devices to ensure accurate measurement of rotor position relative to the stator.

When using PM synchronous machines, absolute position (within one pole pair pitch) is required. Also, the accuracy of this position measurement is critical, as it will affect the performance of the motor control, most noticeably in torque production and linearity. Using a resolver can provide precise position measurement. However, the accuracy of the measurement is directly affected by the initial alignment of the resolver during installation. The installation of the resolver and mechanical alignment can be difficult to control in production.

It is therefore desirable to use a self-aligning start-up algorithm in the motor control.

There is a need to provide an improved method and system to precisely and accurately determine position of a rotor device in a stator for an electrical machine, especially one for application on a fuel/electric hybrid powertrain for a vehicle.

SUMMARY OF THE INVENTION

It is therefore an object of this invention to provide a control system for an electric machine which precisely and accurately determines position of a rotor device relative to a stator for the electrical machine, especially one comprising a synchronous multipole electrical machine, including one for application on a fuel/electric hybrid powertrain for a vehicle.

In accordance with the present invention, a sensorless motor control system is used to estimate rotor position during powertrain start-up. The estimated angle is compared to the measured resolver angle. A correcting offset is added to the resolver signal. After start-up, the control system uses the corrected resolver signal for position feedback and control. In this manner, the installation alignment requirements for the resolver are greatly reduced.

Thus, in accordance with the invention, a control system and a method for controlling an electric machine comprising a multi-phase multipole motor having a stator, a rotor, and a rotor position sensing mechanism is provided. The control system comprises an inverter operable to transmit electrical energy between the stator of the electrical machine and an electrical storage device, and a controller. The controller includes executable algorithms and predetermined calibrations which derive a rotor position based upon a sensorless position sensing technique, and determine an offset parameter between the derived rotor position and a sensed rotor position. The inverter is controlled based upon the sensed rotor position and the offset parameter. The offset parameter is stored in a non-volatile memory device of the control system for future reference.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the accompanying drawings which form a part hereof, and wherein.

DETAILED DESCRIPTION OF THE PREFERRED EMBODIMENT

Figure 1:
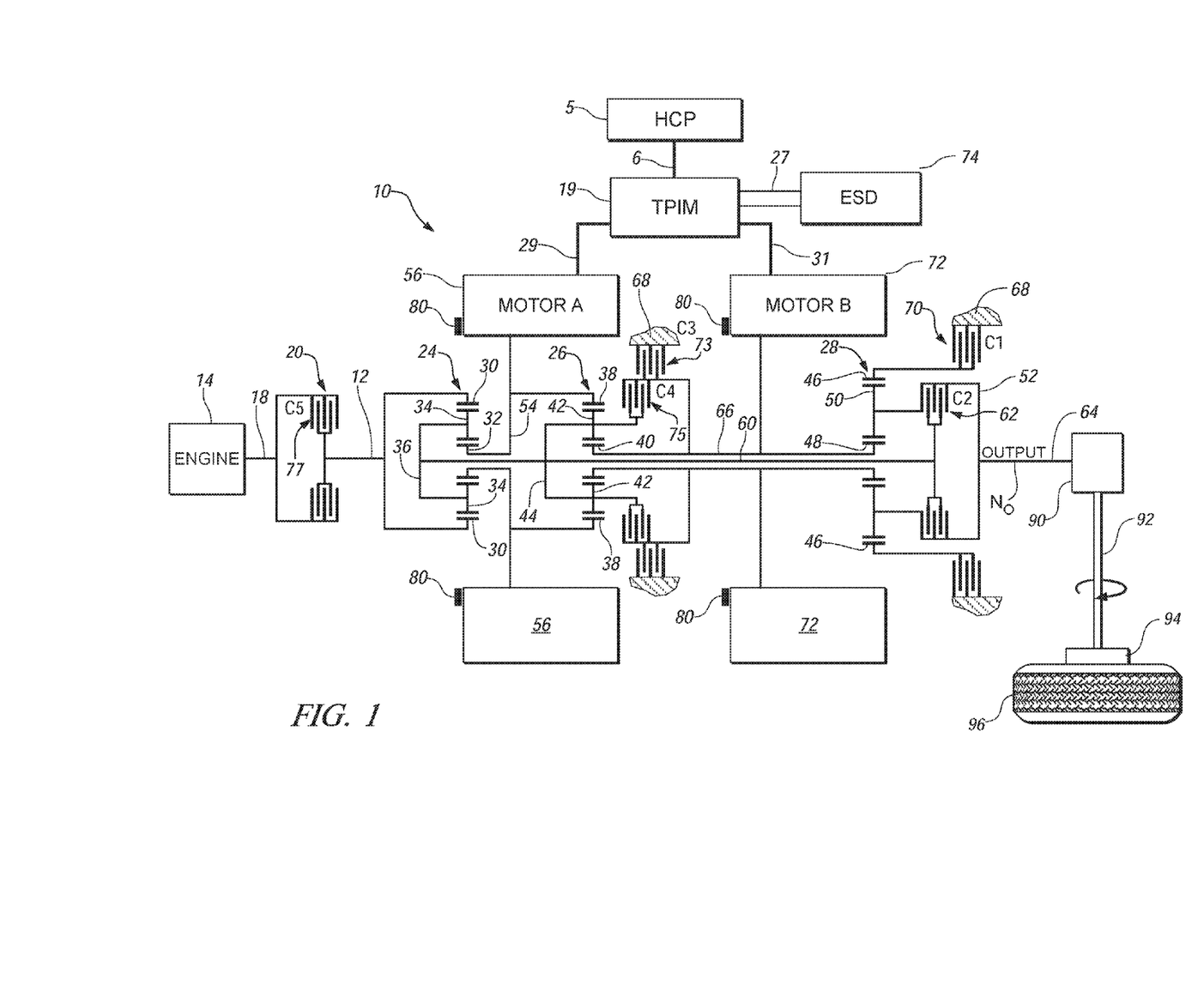
FIGS. 1 and 2 are schematic diagrams of an exemplary powertrain and control architecture, in accordance with the present invention.
Figure 2:
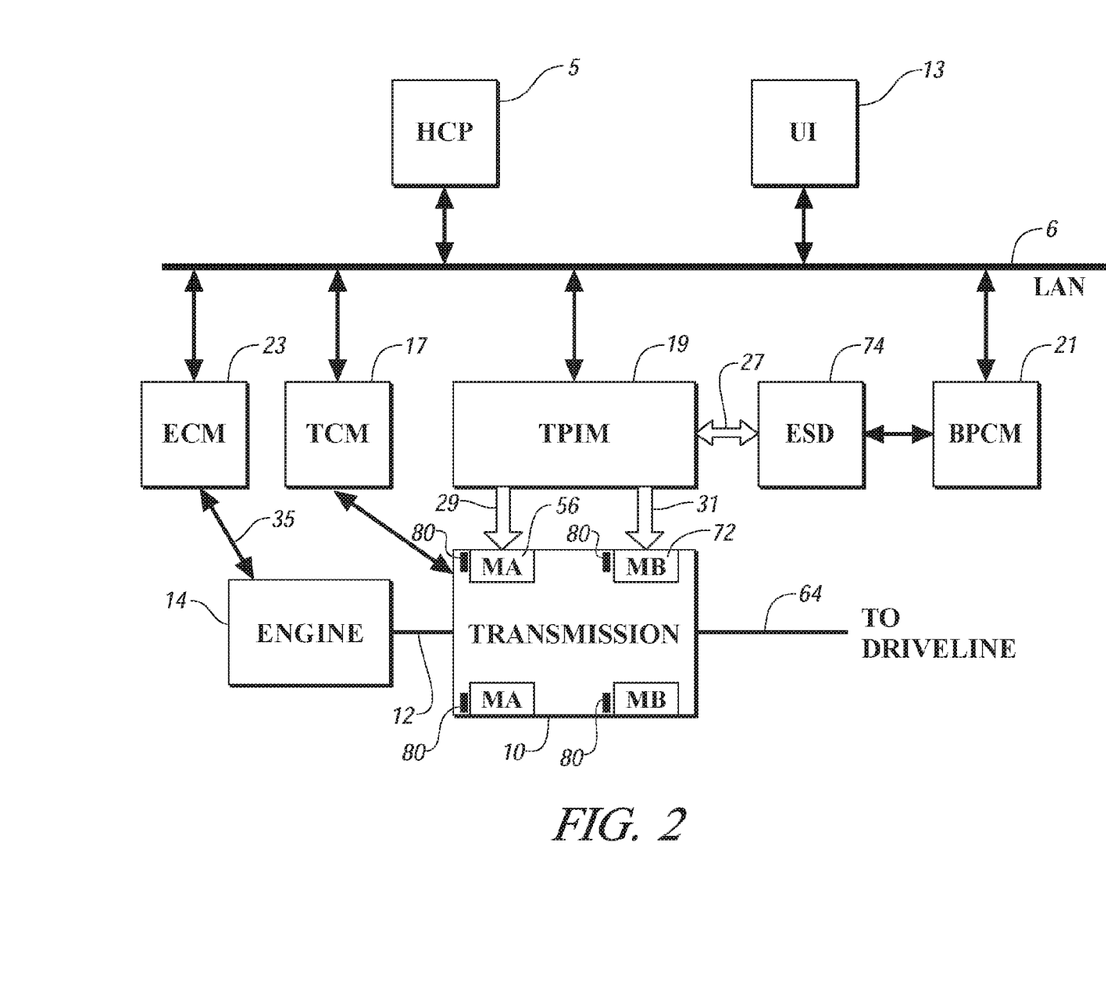

Referring now to the drawings, wherein the showings are for the purpose of illustrating the invention only and not for the purpose of limiting the same, FIGS. 1 and 2 depict a system comprising an engine 14, transmission 10, control system, and driveline which has been constructed in accordance with an embodiment of the present invention.

Mechanical aspects of exemplary transmission 10 are disclosed in detail in commonly assigned U.S. Pat. No. 6,953, 409 entitled TWO-MODE, COMPOUND-SPLIT, HYBRID ELECTRO-MECHANICAL TRANSMISSION HAVING FOUR FIXED RATIOS, which is incorporated herein by reference. The exemplary two-mode, compound-split, electro-mechanical transmission embodying the concepts of the present invention is depicted in FIG. 1, and is designated generally by the numeral 10. The transmission 10 has an input shaft 12 preferably directly driven by an engine 14. A transient torque damper 20 is incorporated between the output shaft 18 of the engine 14 and the input member 12 of the transmission 10. The transient torque damper 20 preferably comprises a torque transfer device 77 having characteristics of a damping mechanism and a spring. The transient torque damper 20 permits selective engagement of the engine 14 with the transmission 10. The torque transfer device 77 is not utilized to change, or control, the mode in which the transmission 10 operates. The torque transfer device 77 preferably comprises a hydraulically operated friction clutch, referred to as clutch C5.

The engine 14 may be any of numerous forms of internal combustion engines, such as a spark-ignition engine or a compression-ignition engine, readily adaptable to provide a torque output to the transmission 10 at a range of operating speeds, from idle, at or near 600 revolutions per minute (RPM), to over 6,000 RPM. Irrespective of the means by which the engine 14 is connected to the input member 12 of the transmission 10, the input member 12 is connected to a planetary gear set 24 in the transmission 10.

Referring specifically now to FIG. 1, the transmission 10 utilizes three planetary-gear sets 24, 26 and 28. The first planetary gear set 24 has an outer ring gear member 30 which circumscribes an inner, or sun gear member 32. A plurality of planetary gear members 34 are rotatably mounted on a carrier 36 such that each planetary gear member 34 meshingly engages both the outer gear member 30 and the inner gear member 32.

The second planetary gear set 26 has an outer ring gear member 38, which circumscribes an inner sun gear member 40. A plurality of planetary gear members 42 are rotatably mounted on a carrier 44 such that each planetary gear 42 meshingly engages both the outer gear member 38 and the inner gear member 40.

The third planetary gear set 28 has an outer ring gear member 46, which circumscribes an inner sun gear member 48. A plurality of planetary gear members 50 are rotatably mounted on a carrier 52 such that each planetary gear 50 meshingly engages both the outer gear member 46 and the inner gear member 48.

The three planetary gear sets 24, 26 and 28 each comprise simple planetary gear sets. Furthermore, the first and second planetary gear sets 24 and 26 are compounded in that the inner gear member 32 of the first planetary gear set 24 is conjoined through a hub plate gear 54 to the outer gear member 38 of the second planetary gear set 26. The conjoined inner gear member 32 of the first planetary gear set 24 and the outer gear member 38 of the second planetary gear set 26 are continuously connected to a first electrical machine comprising a motor/generator 56, referred to as Motor A or "MA".

The planetary gear sets 24 and 26 are further compounded in that the carrier 36 of the first planetary gear set 24 is conjoined through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, through a torque transfer device 62 which, as will be hereinafter more fully explained, is employed to assist in the selection of the operational modes of the transmission 10. The carrier 52 of the third planetary gear set 28 is connected directly to the transmission output member 64.

In the embodiment described herein, wherein the transmission 10 is used in a land vehicle, the output member 64 is operably connected to a driveline comprising a gear box 90 or other torque transfer device which provides a torque output to one or more vehicular axles 92 or half-shafts (not shown). The axles 92, in turn, terminate in drive members 96. The drive members 96 can be either front or rear wheels of the vehicle on which they are employed, or they may be a drive gear of a track vehicle. The drive members 96 may have some form of wheel brake 94 associated therewith. The drive members each have a speed parameter, $N_{WHL}$, comprising rotational speed of each wheel 96 which is typically measurable with a wheel speed sensor.

The inner gear member 40 of the second planetary gear set 26 is connected to the inner gear member 48 of the third planetary gear set 28, through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the transmission 10. The sleeve shaft 66 is also continuously connected to a second electrical machine comprising a motor/generator 72, referred to as MB.

All the planetary gear sets 24, 26 and 28 as well as the two electrical machines 56 and 72 are coaxially oriented, as about the axially disposed shaft 60. Electrical machines 56 and 72 are both of an annular configuration which permits them to circumscribe the three planetary gear sets 24, 26 and 28 such that the planetary gear sets 24, 26 and 28 are disposed radially inwardly of the electrical machines 56 and 72. This configuration assures that the overall envelope, i.e., the circumferential dimension, of the transmission 10 is minimized.

A torque transfer device 73 selectively connects the sun gear 40 with ground, i.e., with transmission housing 68. A torque transfer device 75 is operative as a lock-up clutch, locking planetary gear sets 24, 26, electrical machines 56, 72 and the input to rotate as a group, by selectively connecting the sun gear 40 with the carrier 44. The torque transfer devices 62, 70, 73, 75 are all friction clutches, respectively referred to as follows: clutch C1 70, clutch C2 62, clutch C3 73, and clutch C4 75. Each clutch is preferably hydraulically actuated, receiving pressurized hydraulic fluid from a pump when a corresponding clutch control solenoid is actuated. Hydraulic actuation of each of the clutches is accomplished using a known hydraulic fluid circuit having a plurality of clutch-control solenoids, which is not described in detail herein.

The transmission 10 receives input motive torque from the torque-generative devices, including the engine 14 and the electrical machines 56 and 72, as a result of energy conversion from fuel or electrical potential stored in an electrical energy storage device (ESD) 74. The ESD 74 typically comprises one or more batteries. Other electrical energy and electrochemical energy storage devices that have the ability to store electric power and dispense electric power may be used in place of the batteries without altering the concepts of the present invention. The ESD 74 is preferably sized based upon factors including regenerative requirements, application issues related to typical road grade and temperature, and propulsion requirements such as emissions, power assist and electric range. The ESD 74 is high voltage DC-coupled to transmission power inverter module (TPIM) 19 via DC lines or transfer conductors 27. The TPIM 19 is an element of the control system described hereinafter with regard to FIG. 2. The TPIM 19 communicates with the first electrical machine 56 by transfer conductors 29, and the TPIM 19 similarly communicates with the second electrical machine 72 by transfer conductors 31. Electrical current is transferable to or from the ESD 74 in accordance with whether the ESD 74 is being charged or discharged. TPIM 19 includes the pair of power inverters and respective motor controllers configured to receive motor control commands and control inverter states therefrom for providing motor drive or regeneration functionality.

In motoring control, the respective inverter receives current from the DC lines and provides AC current to the respective electrical machine, i.e. MA and MB, over transfer conductors 29 and 31. In regeneration control, the respective inverter receives AC current from the electrical machine over transfer conductors 29 and 31 and provides current to the DC lines 27. The net DC current provided to or from the inverters determines the charge or discharge operating mode of the electrical energy storage device 74. Preferably, MA 56 and MB 72 are three-phase AC machines and the inverters comprise complementary three-phase power electronics.

Referring now to FIG. 2, a schematic block diagram of the control system, comprising a distributed controller architecture, is shown. The elements described hereinafter comprise a subset of an overall vehicle control architecture, and are operable to provide coordinated system control of the powertrain system described herein. The control system is operable to synthesize pertinent information and inputs, and execute algorithms to control various actuators to achieve control targets, including such parameters as fuel economy, emissions, performance, driveability, and protection of hardware, including batteries of ESD 74 and MA and MB 56, 72. The distributed controller architecture includes engine control module ('ECM') 23, transmission control module ('TCM') 17, battery pack control module ('BPCM') 21, and Transmission Power Inverter Module ('TPIM') 19. A hybrid control module ('HCP') 5 provides overarching control and coordination of the aforementioned controllers. There is a User Interface ('UI') 13 operably connected to a plurality of devices through which a vehicle operator typically controls or directs operation of the powertrain, including the transmission 10. Exemplary vehicle operator inputs to the UI 13 include an accelerator pedal, a brake pedal, transmission gear selector, and, vehicle speed cruise control. Each of the aforementioned controllers communicates with other controllers, sensors, and actuators via a local area network ('LAN') bus 6. The LAN bus 6 allows for structured communication of control parameters and commands between the various controllers. The specific communication protocol utilized is application-specific. By way of example, one communications protocol is the Society of Automotive Engineers standard J1939. The LAN bus and appropriate protocols provide for robust messaging and multi-controller interfacing between the aforementioned controllers, and other controllers providing functionality such as antilock brakes, traction control, and vehicle stability.

The HCP 5 provides overarching control of the hybrid powertrain system, serving to coordinate operation of the ECM 23, TCM 17, TPIM 19, and BPCM 21. Based upon various input signals from the UI 13 and the powertrain, including the battery pack, the HCP 5 generates various commands, including: an engine torque command, clutch torque commands, $T_{CL\_N}$ for the various clutches C1, C2, C3, C4 of the transmission 10; and motor torque commands, $T_A$ and $T_B$, for MA and MB, respectively.

The ECM 23 is operably connected to the engine 14, and functions to acquire data from a variety of sensors and control a variety of actuators, respectively, of the engine 14 over a plurality of discrete lines collectively shown as aggregate line 35. The ECM 23 receives the engine torque command, $T_{E\_CMD}$, from the HCP 5, and generates a desired axle torque, and an indication of actual engine torque, $T_I$, input to the transmission, which is communicated to the HCP 5. For simplicity, ECM 23 is shown generally having bi-directional interface with engine 14 via aggregate line 35. Various other parameters that are sensed by ECM 23 include engine coolant temperature, engine input speed ($N_I$) to shaft 12 leading to the transmission, manifold pressure, ambient air temperature, and ambient pressure. Various actuators that are controlled by the ECM 23 include fuel injectors, ignition modules, and throttle control modules.

The TCM 17 is operably connected to the transmission 10 and functions to acquire data from a variety of sensors and provide command signals to the transmission. Inputs from the TCM 17 to the HCP 5 include estimated clutch torques, $T_{CL\_N}\_EST$, for each of the clutches C1, C2, C3, and, C4 and rotational speed, $N_O$, of the output shaft 64. Other actuators and sensors may be used to provide additional information from the TCM to the HCP for control purposes.

The BPCM 21 is signally connected one or more sensors operable to monitor electrical current or voltage parameters of the ESD 74 to provide information about the state of the batteries to the HCP 5. Such information includes battery state-of-charge, battery voltage, $V_{BAT}$, and available battery power, $P_{BAT\_MIN}$ and $P_{BAT\_MAX}$.

The Transmission Power Inverter Module (TPIM) 19 includes a pair of power inverters and motor controllers configured to receive motor control commands and control inverter states therefrom to provide motor drive or regeneration functionality. The TPIM 19 is operable to generate torque commands for MA 56 and MB 72, $T_A$ and $T_B$, based upon input from the HCP 5, which is driven by operator input through UI 13 and system operating parameters. The motor torque commands for MA and MB, i.e. $T_A$ and $T_B$, are implemented by the control system, including the TPIM 19, to control MA and MB. Individual motor speed signals, $N_A$ and $N_B$ for MA and MB respectively, are derived by the TPIM 19 from the motor phase information or conventional rotation sensors. The TPIM 19 determines and communicates motor speeds, $N_A$ and $N_B$, to the HCP 5. The electrical energy storage device 74 is high-voltage DC-coupled to the TPIM 19 via DC lines 27. Electrical current is transferable to or from the TPIM 19 in accordance with whether the ESD 74 is being charged or discharged.

Each of the aforementioned controllers is preferably a general-purpose digital computer generally comprising a microprocessor or central processing unit, storage mediums comprising read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM and executed to provide the respective functions of each computer. Information transfer between the various computers is preferably accomplished using the aforementioned LAN 6.

Algorithms for control and state estimation in each of the controllers are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

In response to an operator's action, as captured by the UI 13, the supervisory HCP controller 5 and one or more of the other controllers determine required transmission output torque, $T_O$ at shaft 64. Selectively operated components of the transmission 10 are appropriately controlled and manipulated to respond to the operator demand. For example, in the exemplary embodiment shown in FIGS. 1 and 2, when the operator has selected a forward drive range and manipulates either the accelerator pedal or the brake pedal, the HCP 5 determines an output torque for the transmission, $T_O$, which affects how and when the vehicle accelerates or decelerates. Final vehicle acceleration is affected by other factors, including, e.g., road load, road grade, and vehicle mass. The HCP 5 monitors the parametric states of the torque-generative devices, and determines the output of the transmission required to arrive at the desired torque output. Under the direction of the HCP 5, the transmission 10 operates over a range of output speeds from slow to fast in order to meet the operator demand.

The two-mode, compound-split, electro-mechanical transmission, includes output member 64 which receives output power through two distinct gear trains within the transmission 10, and operates in several transmission operating modes, described with reference now to FIG. 1, and Table 1, below.

TABLE 1

| Transmission Operating Mode | Actuated Clutches | |
|---|---|---|
| Mode I | C1 70 | |
| Fixed Ratio (GR1) | C1 70 | C4 75 |
| Fixed Ratio (GR2) | C1 70 | C2 62 |
| Mode II | C2 62 | |
| Fixed Ratio (GR3) | C2 62 | C4 75 |
| Fixed Ratio (GR4) | C2 62 | C3 73 |

The various transmission operating modes described in the table indicate which of the specific clutches C1, C2, C3, C4 are engaged or actuated for each of the operating modes. Additionally, in various transmission operating modes, MA and MB may each operate as electrical motors to generate motive torque, or as a generator to generate electrical energy. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28. Other factors outside the scope of the invention affect when MA and MB 56, 72 operate as motors and generators, and are not discussed herein.

The control system, shown primarily in FIG. 2, is operable to provide a range of transmission output speeds, $N_O$, of shaft 64 from relatively slow to relatively fast within each mode of operation. The combination of two modes with a slow-to-fast output speed range in each mode allows the transmission 10 to propel the vehicle from a stationary condition to highway speeds, and meet various other requirements as previously described. Additionally, the control system coordinates operation of the transmission 10 so as to allow synchronized shifts between the modes.

The first and second modes of operation refer to circumstances in which the transmission functions are controlled by one clutch, i.e. either clutch C1 62 or C2 70, and by the controlled speed and torque of the electrical machines 56 and 72, which can be referred to as a continuously variable mode. Certain ranges of operation are described below in which fixed ratios are achieved by applying an additional clutch. This additional clutch may be clutch C3 73 or C4 75, as shown in the table, above.

When the additional clutch is applied, fixed ratio of input-to-output speed of the transmission, i.e. $N_I/N_O$, is achieved. The rotations of machines MA and MB 56, 72 are dependent on internal rotation of the mechanism as defined by the clutching and proportional to the input speed, $N_I$, determined or measured at shaft 12. The machines MA and MB function as motors or generators. They are completely independent of engine-to-output power flow, thereby enabling both to be motors, both to function as generators, or any combination thereof. This allows, for instance, during operation in Fixed Ratio 1 that motive power output from the transmission at shaft 64 is provided by power from the engine and power from MA and MB, through planetary gear set 28 by accepting power from the energy storage device 74.

The transmission operating mode can be switched between Fixed Ratio operation and continuously variable Mode operation by activating or deactivating one the additional clutches during Mode I or Mode II operation. Determination of operation in fixed ratio or mode control is by algorithms executed by the control system, and is outside the scope of this invention. The modes of operation may overlap the ratio of operation, and selection depends again on the driver's input and response of the vehicle to that input. RANGE 1 falls primarily within mode I operation when clutches C1 70 and C4 75 are engaged. RANGE 2 falls within mode I and mode II when clutches C2 62 and C1 70 are engaged. A third fixed ratio range is available primarily during mode II when clutches C2 62 and C4 75 are engaged, and a fourth fixed ratio range is available during mode II when clutches C2 62 and C3 73 are engaged. It is notable that ranges of operation for Mode I and Mode II typically overlap significantly.

Figure 8:
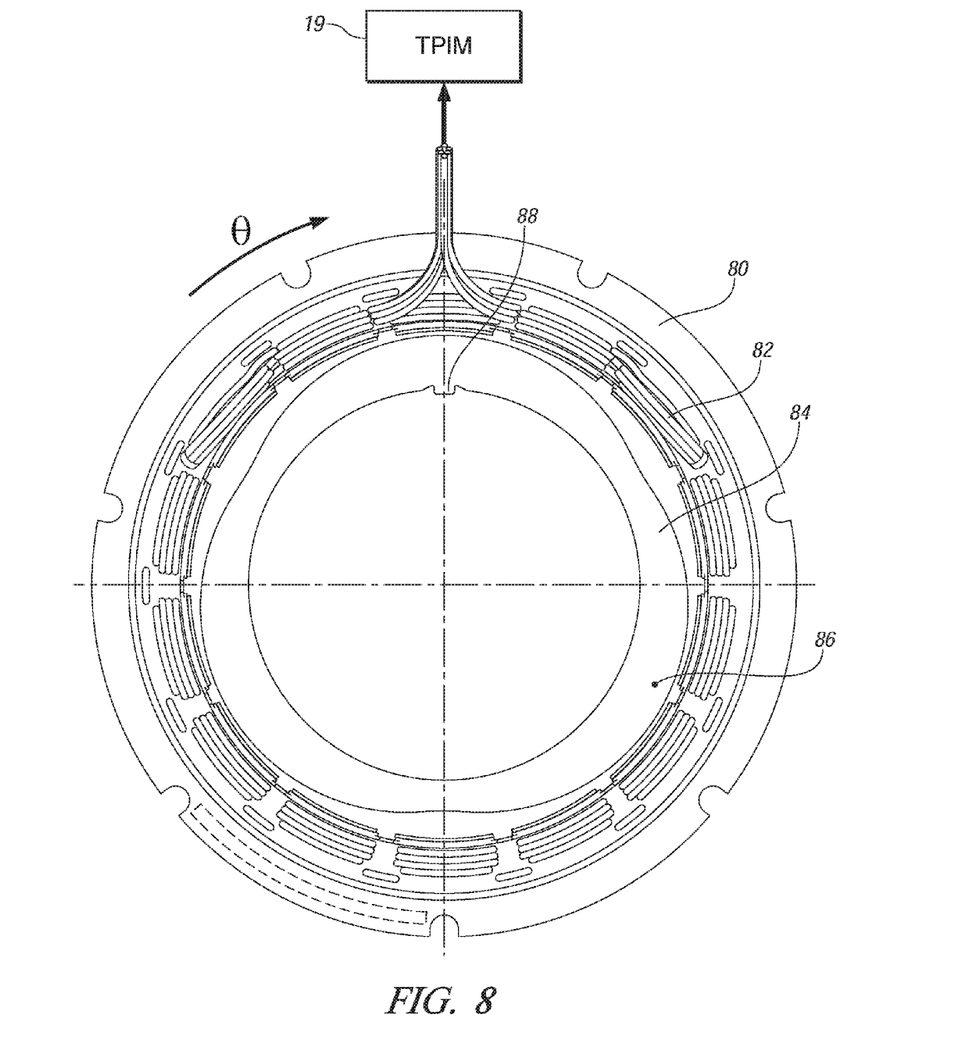
FIG. 8 is a schematic diagram of an element of a component, in accordance with the present invention.

Referring again to FIG. 1, and with reference now to FIG. 8, the electric machines MA and MB 56, 72 are known three-phase AC electrical machines and the inverters comprise known complementary three-phase power electronics. MA and MB are coaxially oriented about the axially disposed shaft 60. MA and MB are both of an annular configuration permitting them to circumscribe the three planetary gear sets 24, 26 and 28 such that the planetary gear sets 24, 26 and 28 are disposed radially inwardly of MA and MB. Each machine includes a stator, a rotor, and a resolver assembly 80, shown also with reference to FIG. 8. The motor stator for each machine is grounded to outer transmission housing 68, and includes a stator core with coiled electrical windings extending therefrom. The rotor for MA 56 is supported on a hub plate gear 54 that is operably attached to output shaft 60 via carrier 36. The rotor for MB 72 is attached to sleeve shaft hub 66. Each motor resolver assembly 80 is appropriately positioned and assembled on one of MA and MB, such that a notch 88 is oriented at magnetic, or true north. Each resolver assembly 80 of this embodiment comprises a known variable reluctance device including a resolver stator 82, operably connected to the stator for each machine, and a resolver rotor 84, operably connected to the rotor for each machine described above. Each resolver 80 comprises a sensing device operable to sense rotational position of the resolver stator relative to the resolver rotor, and identify the rotational position relative to notch 88. Each resolver stator 82 comprises a series of inductive coils assembled thereon which receive an electrical excitation signal from the TPIM 19, and a pair of sensing, or pickup, coils which provide an electrical signal output to the TPIM 19. Each resolver rotor 84 comprises a rotating device having a plurality of lobes 86, or eccentricities, located on the outer circumference. In the exemplary system shown in FIG. 8 there are three lobes shown, but the system is operative using various quantities of lobes 86. In operation, the resolver rotor 84 rotates with the motor rotor. The pickup coils are excited by the excitation signal and return a signal to the TPIM at the same frequency as the excitation frequency and having a voltage level that is dependent upon the proximity of the of the lobed resolver rotor 84 to the resolver stator 82. The resolver 80 operates by sensing relative position and motion of the resolver rotor rotating within the resolver stator. The control system is able to interpret the signal returned through the resolver stator to determine rotor position, as is described herein. The variable reluctance device for the resolver 80 is one of several known technologies useable to determine position.

The invention, described with reference to the embodiment described above, comprises utilizing elements of the distributed control system to operate MA and MB, to provide motive torque and regenerative torque for the vehicle powertrain system. The overall control system operates the TPIM 19 to transmit electrical energy between the stator of each electrical machine and the ESD 74. The TPIM operates to measure a position of the resolver rotor and hence the machine rotor, using the resolver stator device, measured relative to notch 88 of the rotor 84, including known signal processing methods. The TPIM acts to derive a position of the machine rotor using a sensorless position sensing technique, described hereinbelow. The derived position of the machine rotor is a true position of the machine rotor. The TPIM determines an offset parameter, comprising an angular difference between the derived position of the machine rotor and the measured position of the resolver rotor. The TPIM operates to control electrical energy input to each of the coils of the stator for the three-phase multipole motor, using the offset parameter. The offset parameter is preferably stored in a non-volatile memory device within the TPIM or other element of the control system, for use in future operation. An alternative control system preferably includes an on-board algorithm that provides statistical analysis of a plurality of offset parameters calculated over subsequent starting events, using such known techniques as exponentially weighted moving averages. A parametric value for the offset is preferably determined once during each operation of the engine or vehicle. The control system preferably operates to derive the rotor position during initial machine operation, i.e. at engine startup or immediately thereafter. The control system is preferably operable to determine the offset parameter when the machine is operating in a motive torque-generative mode and when operating in an electrical energy-generative mode.

One exemplary method for sensorless position sensing comprises injecting a high frequency signal into the stator of the electrical machine at low operating speed, during initial machine operation; and, detecting a position of the rotor based upon the injected high frequency signal. This includes determining a north/south polarity of the resolver rotor prior to, or simultaneously with determining its position, in systems wherein this is necessary. The technique is described as below.

Figure 3:
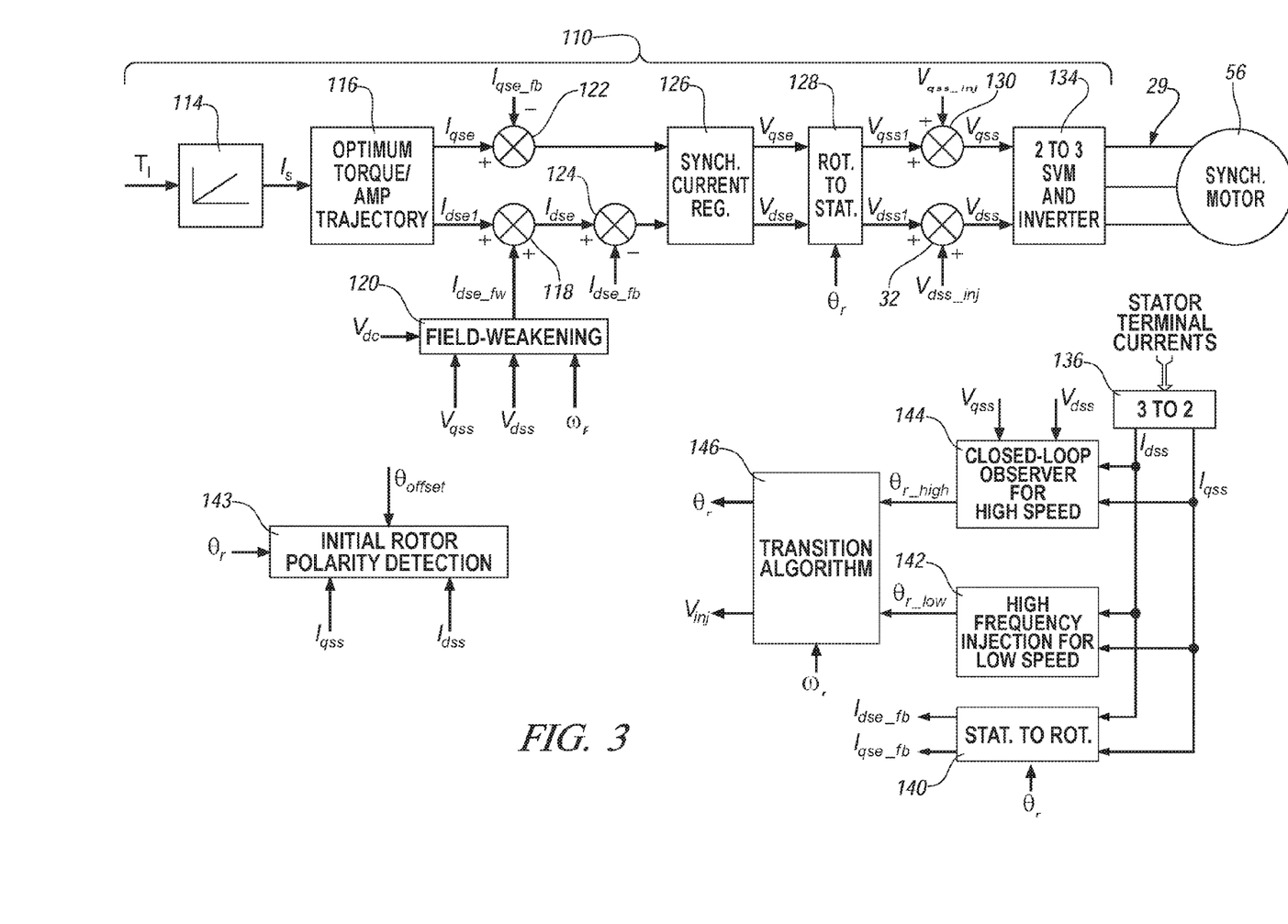
FIGS. 3, 4, and 5 are schematic diagrams of a control scheme, in accordance with the present invention.
Figure 4:
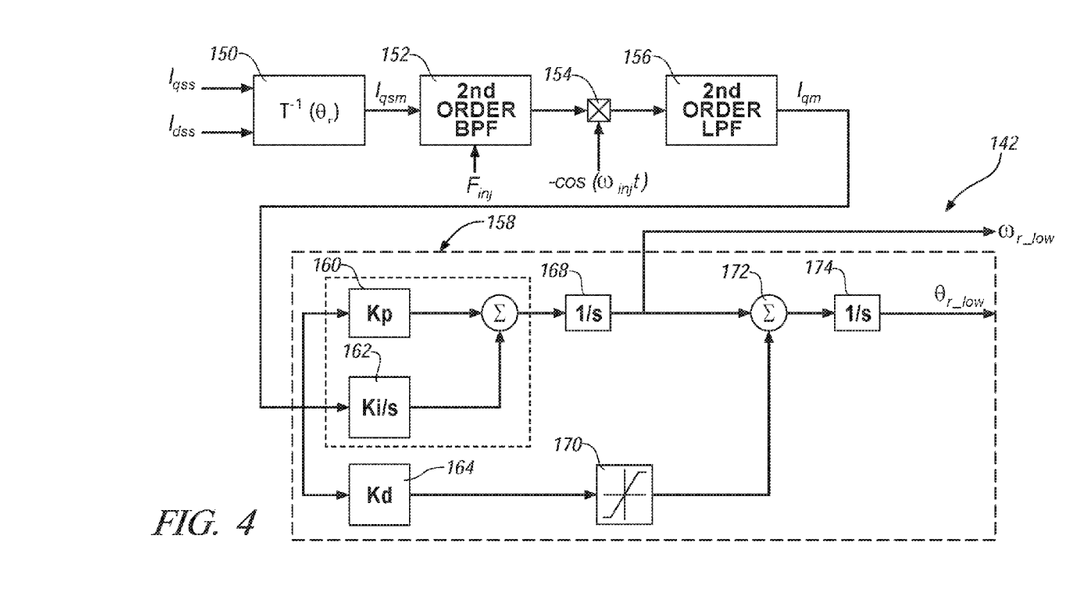
Figure 5:
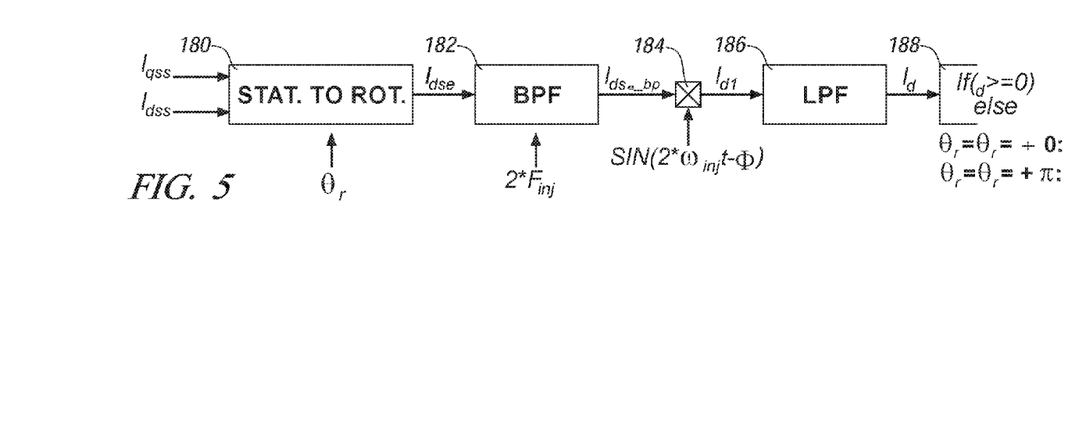

Referring now to FIGS. 3, 4, and 5, a diagrammatic drawing of an embodiment of the exemplary sensorless position sensing scheme 110, for execution as a coded algorithm in the distributed control system described hereinabove, is now described. The position sensing scheme 110 is illustrated as a sequence of block diagrams that represent software executed in the distributed control system, to control one of electrical machines MA and MB 56, 72. Alternate embodiments of electric machines which may employ the control system described herein include motor technologies such as, synchronous reluctance motors, and interior permanent magnet motors. In operation, the HCP 5 generates input torque command $T_I$, previously described. The torque command $T_I$ is processed by a torque linearization model 114 to generate a corresponding stator current $I_s$ required to develop the desired electromagnetic torque in the machine. The stator current generated at block 114 is then passed to an optimum torque per amp block 116. Block 116 processes the commanded stator current and decomposes it into the respective D and Q axis components of current command ($I_{dse1}$ and $I_{qse}$) to provide the maximum torque for the given stator current amplitude.

The current command $I_{dse1}$ is added to a field weakening component $I_{dse\_fw}$ generated at summing junction 118 to generate the final D axis current command $I_{dse}$. The field weakening component $I_{dse\_fw}$ is generated by a field weakening block 120 using the measured DC link voltage $V_{dc}$, commanded output voltages $V_{qss}$ and $V_{dss}$, and rotor angular velocity $\omega_r$. Summing junction 122 subtracts the feedback current $I_{qse\_fb}$ from the Q axis current command $I_{qse}$ to obtain the error of the Q axis current regulator. Summing junction 124 subtracts the feedback current from $I_{dse\_fb}$ from the D axis current command $I_{dse}$ to obtain the error of the D axis current regulator. The errors generated by the summing junctions 122 and 124 are used by a synchronous current regulator block 126 to control the synchronous frame voltage commands $V_{dse}$ and $V_{qse}$.

Block 128 uses the estimated rotor angular position $\theta_r$ to convert the synchronous frame voltage commands $V_{dse}$ and $V_{qse}$ to the stationary frame voltage commands $V_{dss1}$ and $V_{qss1}$. The high frequency voltage signals $V_{dss\_inj}$ and $V_{qss\_inj}$ are added to the stationary reference frame voltage commands by the summing junctions 130 and 132, resulting in the final voltage commands $V_{dss}$ and $V_{qss}$. The voltage source inverter 134 processes the final voltage commands $V_{dss}$ and $V_{qss}$ to generate the actual phase voltages applied the motor 56. The phase currents are measured and processed by a three-phase to two-phase transformation block 136. The outputs of the block 136 are stationary frame currents $I_{dss}$ and $I_{qss}$. A stationary to rotating frame transformation block 140 uses the stationary frame currents $I_{dss}$ and $I_{qss}$ and the estimated rotor angular position $\theta_r$ to generate synchronous reference frame feedback currents $I_{dse\_fb}$ and $I_{qse\_fb}$.

The present invention includes sensorless control of the rotor speed and position that includes: a low speed rotor angular position estimation method/observer at block 142; an initial rotor polarity detection method at block 143, when needed; a high speed rotor angular position estimation method/observer at block 144; and a transition algorithm at block 146 to seamlessly merge the low and high speed estimation methods, when the high speed rotor angular position estimation method is utilized.

Block 142 of FIG. 3 represents the low speed estimation method of the present invention. FIG. 4 shows a detailed block diagram implementation of block 142 to estimate rotor electrical position during low-speed operations as described above. The low speed estimation method is used to estimate rotor electrical position during zero and low-speed operations (preferably <10% of rated machine speed but any machine speed is considered within the scope of the low speed estimation method of the present invention). The estimation of the rotor electrical position is performed by injecting a high frequency voltage signal on an estimated D axis of the machine. The fluctuating high frequency signal in a synchronously rotating reference frame with the fundamental stator frequency is used to detect an asymmetry of the spatial impedance in an AC machine. An asymmetry of the spatial impedance is caused by salient construction of the rotor of the machine or induced magnetic saturation in the machine.

When the high frequency voltage signal is injected on the estimated D axis, the orthogonal component of the current measured at the estimated reference frame can be used as an error signal as shown by Eq. 1.

$$\begin{pmatrix} i_{dsi}^m \\ i_{qsi}^m \end{pmatrix} = \begin{pmatrix} y_{avg} + y_{diff}\cos 2\theta_{err} & -y_{diff}\sin 2\theta_{err} \\ -y_{diff}\sin 2\theta_{err} & y_{avg} - y_{diff}\cos 2\theta_{err} \end{pmatrix} \begin{pmatrix} v_{dsi}^m \\ v_{qsi}^m \end{pmatrix} \quad [1]$$

wherein $y_{avg}=(z_q^e+z_d^e)/2z_d^e z_q^e$ and $y_{diff}=(z_q^e-z_d^e)/2z_d^e z_q^e$. If the voltage signal is injected on the estimated D-axis ($v_{dsi}^m=V_{inj}\sin\omega_h t$ and $v_{qsi}^m=0$) then in the Q-axis current signal the diagonal component disappears and the off-diagonal component appears as shown in Eq. 2. If resistive components are much smaller than inductive components ($r_d^e$, $r_q^e \ll x_d^e$, $x_q^e$) at the high frequency and also the impedance difference of the reactive component is much larger than that of the resistive component ($|x_d^e - x_q^e| \gg |r_d^e - r_q^e|$), then Eq. 2 can be simplified as shown in Eq. 3 in quasi-steady-state.

$$i_{qsi}^m = (-y_{diff}\sin 2\theta_{err}) \cdot V_{inj}\sin\omega_h t = \left[\frac{(r_d^e - r_q^e) + j(x_d^e - x_q^e)}{(r_d^e + jx_d^e)\cdot(r_q^e + jx_q^e)}\right] \cdot (V_{inj}\sin 2\theta_{err}) \cdot \sin\omega_h t \quad [2]$$

$$i_{qsi}^m \approx -j\frac{x_d^e - x_q^e}{x_d^e x_q^e} \cdot (V_{inj}\sin 2\theta_{err}) \cdot \sin\omega_h t = \quad [3]$$
$$-\frac{x_d^e - x_q^e}{x_d^e x_q^e} \cdot (V_{inj}\sin 2\theta_{err}) \cdot \cos\omega_h t$$

Multiplying the orthogonal signal with respect to the injected signal results in the DC quantity of the error signal for the tracking controller. After low-pass filtering the DC quantity can be obtained as shown in Eq. 4:

$$\varepsilon = LPF[i_{qsi}^m \times (-\cos\omega_h t)] = -\frac{Y_2}{2}\sin 2\theta_{err} \approx -Y_2\theta_{err} \quad [4]$$
$$\text{wherein } Y_2 = -\frac{x_d^e - x_q^e}{x_d^e x_q^e}.$$

Referring to FIG. 4, block 150 converts the stationary frame currents $I_{qss}$ and $I_{dss}$ to the estimated synchronous reference frame current $I_{qsm}$. Block 152 comprises a second order band pass filter to allow only the injection high frequency signal (preferably in the range 500 to 1000 Hz) to be processed at multiplying junction 154. Junction 154 multiplies the output of the BPF of block 152 by the term $-\cos(\omega_{inj}t)$ to extract the DC component of the error signal. Block 156 comprises a second order low pass filter to remove high frequency harmonics from the signal and output the term $I_{qm}$. $I_{qm}$ is an error signal defined in Eq. 4.

Block 158 is a third order position observer that processes the error term $I_{qm}$. $I_{qm}$ is processed by proportional control block 160, integral control block 162, and feed-forward control block 164 to generate outputs. The integral and proportional outputs of blocks 160 and 162 are summed at summing junction 166 and processed by block 168 to generate and estimate speed $\omega_{r\_low}$. The output of the feed-forward gain block 164 is processed by a limiter block 170 and then fed-forward to summing junction 172 to be added to the speed output of block 168. Block 174 processes $\omega_{r\_low}$ to generate the term $\theta_{r\_low}$ which is the estimated angular position of the rotor at low speed.

FIG. 5 is a detailed block diagram implementation of the block 143 used to detect initial rotor magnet polarity, for north/south polarity determination. The stationary to rotating reference frame block 180 converts the stationary frame currents $I_{dss}$ and $I_{qss}$ to the synchronous reference frame currents $I_{dse}$ and $I_{qse}$ using $\theta r$. Only the D axis current $I_{dse}$ is used in the initial rotor polarity detection method. $I_{dse}$ is passed through a band-pass filter 182 which filters out all but the second harmonic of the injection frequency of the $I_{dse}$ current. The output of the band-pass filter 182 is $I_{dse\_bp}$. The signal $I_{dse\_bp}$ is demodulated by multiplying it with the term $\sin(2\omega_{inj}t-\phi)$ using the multiplier block 184. The resultant signal $I_{d1}$ contains a DC component and a high frequency component. The low-pass filter block 186 filters out the high frequency component of $I_{d1}$, leaving only the DC portion $I_d$. The signal $I_d$ contains the information on the polarity of the rotor magnet with respect to the estimated machine D axis. Condition block 188 determines the polarity of the estimated position using the sign of the signal $I_d$. This condition is evaluated once during the start-up sequence. If the sign of $I_d$ is negative, 180 degrees is added to the estimated rotor position.

Figure 6:
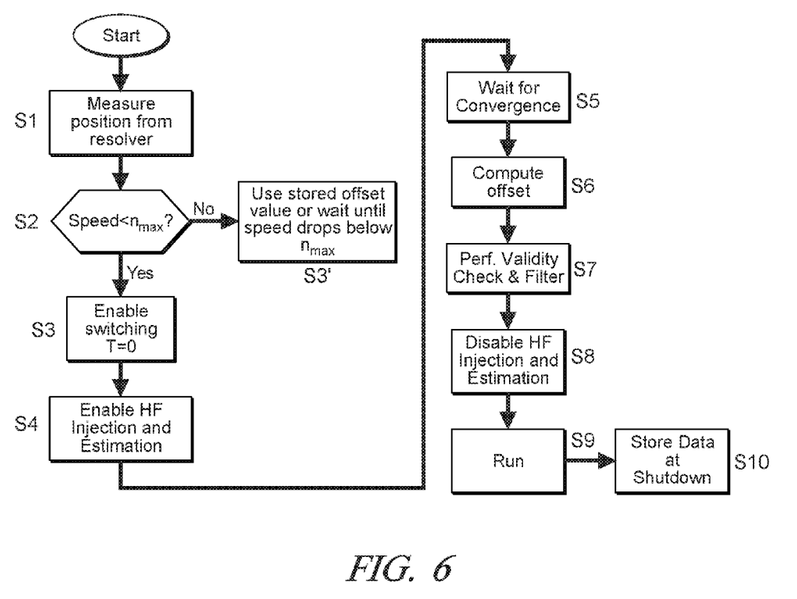
FIG. 6 is an algorithmic flowchart, in accordance with the present invention.

Referring now to FIG. 6, an algorithm, executed in the control system to control the exemplary powertrain shown with reference to FIGS. 1 and 2, is described which implements the exemplary method for sensorless position sensing described hereinabove with reference to FIGS. 3, 4, and 5. The method comprises injecting a high frequency signal into the stator at low operating speed during initial machine operation to detect position of the rotor based upon the injected high frequency signal. The algorithm includes measuring the resolver position using the resolver sensor (S1). When the rotational speed is greater than a calibrated maximum ($n_{max}$), (S2) a previously stored offset value is used by the control system, or alternatively, the algorithm waits until the speed drops below the calibrated maximum ($n_{max}$) (S3'). When the rotational speed is less than the calibrated maximum ($n_{max}$) switching is enabled (S3), the high frequency ('HF') signal is injected, and estimation of the rotor electrical position is performed (S4). The system converges on a value (S5), and the offset is computed (S6). The offset is validated, and filtered (S7), and the high frequency injection and estimation is disabled for the remainder of the operating cycle (S8). The powertrain system operates (S9) using the resolver sensor position and the learned offset. At shutdown, the data is stored in a non-volatile memory storage device of the control system, such as one of the electrically programmable read only memory (EPROM) devices of one of the controllers.

Figure 7:
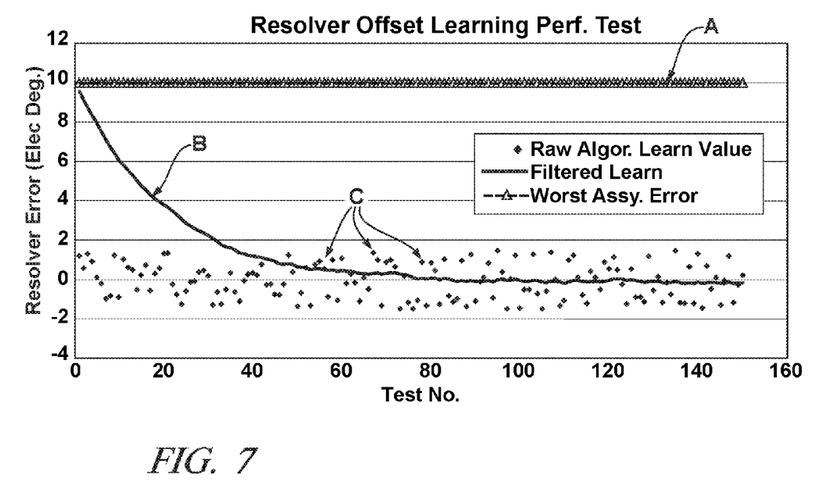
FIG. 7 is a data graph, in accordance with the present invention.

Referring now to FIG. 7, data for the exemplary system is shown. The plotted data comprises a plot of magnitude of resolver error, in electrical degrees. Line A is a representation of the actual resolver error, in this instance comprising a worst-case error created during system assembly, having a magnitude of ten degrees electrical rotation. The data points shown as C in the plot comprise raw algorithm learn values for resolver position, corrected using the invention described herein. In all instances, the magnitude of error of the corrected resolver position is less than two degrees electrical rotation. Line B comprises a filtered, or statistically analyzed resolver learn value, which has an initial offset of ten degrees electrical rotation, which converges to less than two degrees after forty observations, and converges to near zero after eighty observations, thus demonstrating the capability of the method described herein to learn and correct for resolver error.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Control system for an electric machine comprising a multi-phase multipole motor having a machine stator, and a machine rotor, comprising:
 a voltage source inverter generating phase voltages applied to the electric machine in response to final voltage commands provided to the voltage source inverter;
 a resolver assembly comprising a resolver rotor operably connected to the machine rotor and a resolver stator operably connected to the machine stator, said resolver stator providing an electrical signal output; and
 a controller
  providing stationary frame voltages,
  providing stationary frame currents based upon measured phase currents from the electric machine,
  summing voltage signals at a predetermined high frequency with the stationary frame voltages to generate the final voltage commands,
  providing the final voltage commands to the voltage source inverter,
  deriving a machine rotor position based upon the stationary frame currents and the predetermined high frequency,
  measuring a resolver rotor position from the electrical signal output provided from the resolver stator,
  determining an offset parameter as a difference between the derived machine rotor position and the measured resolver rotor position, and
  controlling the voltage source inverter based upon the measured resolver rotor position and the offset parameter.

2. The control system of claim 1, wherein deriving the machine rotor position further comprises deriving the machine rotor position during an initial machine operation.

3. The control system of claim 2, wherein deriving the machine rotor position during the initial machine operation further comprises deriving the machine rotor position during a first second of machine operation after startup of the machine.

4. The control system of claim 2, wherein the initial machine operation comprises machine operation in a torque-generative mode and in an electrical energy-generative mode.

5. The control system of claim 1, wherein deriving the machine rotor position based upon the stationary frame currents and the predetermined high frequency comprises:
 estimating synchronous reference frame currents from the stationary frame currents;
 band pass filtering the synchronous reference frame currents at the predetermined high frequency;
 extracting a DC component from the band pass filtered synchronous reference frame currents;
 low pass filtering the DC component; and
 estimating the machine rotor position as a function of the low pass filtered DC component.

6. The control system of claim 1, further comprising the controller storing the offset parameter in a non-volatile memory device.

7. The control system of claim 1, wherein the resolver stator comprises a plurality of inductive coils and the resolver rotor comprises a plurality of lobes.

8. The control system of claim 1, wherein the electric machine is operatively connected to a two-mode compound split hybrid electro-mechanical transmission.

9. The control system of claim 8, further comprising the two-mode compound split hybrid electro-mechanical transmission configured to transmit motive torque to a driveline of a vehicle.

10. Method for controlling electrical energy transmitted between an energy storage device and an electric machine comprising a multi-phase multipole motor having a machine stator, a machine rotor, and a resolver assembly comprising a resolver rotor operably connected to the machine rotor and a resolver stator operably connected to the machine stator, said resolver stator providing an electrical signal output, comprising:
 deriving a machine rotor position based upon a sensorless position sensing technique, comprising:
  generating phase voltages with a voltage source inverter in response to final voltage commands provided to the voltage source inverter;
  applying the phase voltages to the electric machine;
  providing stationary frame voltages;
  providing stationary frame currents based upon measured phase currents from the electric machine;
  summing voltage signals at a predetermined high frequency with the stationary frame voltages to generate the final voltage commands;
  providing the final voltage commands to the voltage source inverter; and
  deriving the machine rotor position based upon the stationary frame currents and the predetermined high frequency;
 measuring a resolver rotor position from the electrical signal output provided from the resolver stator;
 determining an offset parameter as a difference between the derived machine rotor position and the measured resolver rotor position; and
 controlling electrical energy transmitted between the energy storage device and the electric machine based upon the measured resolver rotor position and the offset parameter.

11. The method of claim 10, wherein deriving the machine rotor position based upon the sensorless position sensing technique further comprises deriving the machine rotor position during initial machine operation.

12. The method of claim 11, wherein deriving the machine rotor position during the initial machine operation further comprises deriving the machine rotor position during a first second of machine operation after startup of the machine.

13. The method of claim 11, wherein the initial machine operation comprises machine operation in a torque-generative mode and in an electrical energy-generative mode.

14. The method of claim 10, further comprising storing the offset parameter in a non-volatile memory device.

15. Article of manufacture, comprising a storage medium having a computer program encoded therein for effecting a method to control electrical energy transmitted between an energy storage device and an electric machine comprising a multi-phase multipole motor having a machine stator, a machine rotor, and a resolver assembly comprising a resolver rotor operably connected to the machine rotor and a resolver stator operably connected to the machine stator, said resolver stator providing an electrical signal output, the program comprising:

code for deriving a machine rotor position based upon a sensorless position sensing technique executed during a startup of the electrical machine comprising:

code for generating phase voltages with a voltage source inverter in response to final voltage commands provided to the voltage source inverter;

code for applying the phase voltages to the electric machine;

code for providing stationary frame voltages;

code for providing stationary frame currents based upon measured phase currents from the electric machine;

code for summing voltage signals at a predetermined high frequency with the stationary frame voltages to generate the final voltage commands;

code for providing the final voltage commands to the voltage source inverter; and         code for deriving the machine rotor position based upon the stationary frame currents and the predetermined high frequency;

code for measuring a resolver rotor position from the electrical signal output provided from the resolver stator;

code for determining an offset parameter as a difference between the derived machine rotor position and the measured resolver rotor position; and     code for controlling electrical energy transmitted between the energy storage device and the electric machine based upon the measured resolver rotor position and the offset parameter.

\* \* \* \* \*